March 19, 1957  F. F. HOWARD, SR., ET AL  2,785,869
FISH LEADER CONTAINER
Filed Aug. 10, 1954

Frank F. Howard, Sr.
Frank F. Howard, Jr.
INVENTORS,

BY *Clarence A. O'Brien*
*and Harvey B. Jacobson*
Attorneys

United States Patent Office 2,785,869
Patented Mar. 19, 1957

2,785,869

FISH LEADER CONTAINER

Frank F. Howard, Sr., and Frank F. Howard, Jr., Carson City, Nev.

Application August 10, 1954, Serial No. 448,954

2 Claims. (Cl. 242—96)

This invention relates generally to sporting equipment, and more particularly, to a novel fish leader container.

The primary object of the present invention resides in the provision of a container for fish leaders or other similar materials in which a line is suitably wound on a protective type reel which not only includes means for supporting and guiding the end of the line, but includes means for cutting the line where desired.

A further object of the invention resides in the provision of a fish leader container which includes guide means operated by a foldable handle for guidingly lifting the line off the reel, the guide being capable of resiliently holding the end of the line.

One of the features of the invention resides in the fact that the fish leader container is formed of a pair of substantially concave plates which substantially encase and protect the fish leader.

Still further objects and features of this invention reside in the provision of a fish leader container that is strong and durable, simple in construction and utilization, and which may be inexpensively produced, thereby permitting wide utilization and distribution.

These, together with the various ancillary objects and features of the invention which will become apparent as the following description proceeds, are attained by this fish leader container, a preferred embodiment of which has been illustrated in the accompanying drawings by way of example only, wherein.

Figure 1:
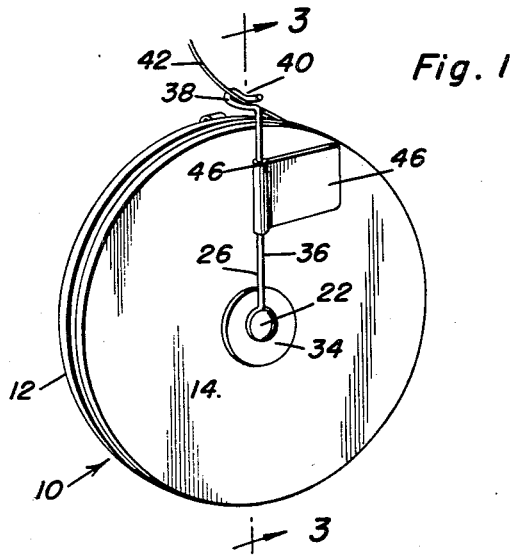
Figure 1 is a perspective view of the fish leader container comprising the present invention.
Figure 2:
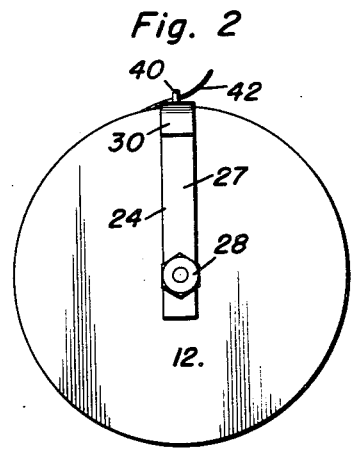
Figure 2 is a side elevational view of the fish leader container.
Figure 3:
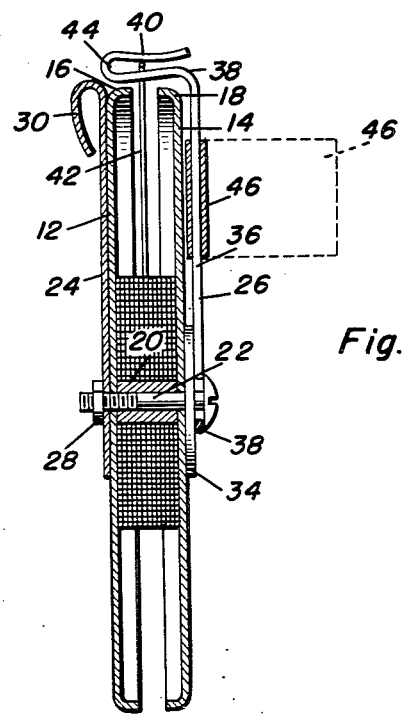
Figure 3 is an enlarged vertical sectional view as taken along the plane of line 3—3 in Figure 1.
Figure 4:
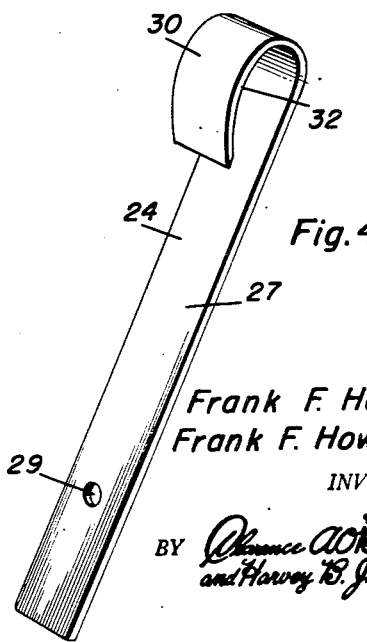
Figure 4 is an enlarged perspective view of the cutter blade comprising one of the elements of the invention.

With continuing reference to the accompanying drawings, wherein like reference numerals designate similar parts throughout the various views, reference numeral 10 generally designates the fishing leader container comprising the present invention. This fishing leader container 10 includes a pair of spaced plates 12 and 14 which have arcuately inturned peripheral edges 16 and 18, thus providing the plates 12 and 14 with a concave or dish-like shape.

The plates are held in spaced relationship by means of a spacer 20 which serves as the drum of the fish leader container and through which a bolt 22 extends, the bolt 22 also extending through the plates 12 and 14 at the centers thereof. The bolt 22 therefore serves as a shaft for rotatably mounting a cutter blade 24 as well as guide means 26. The bolt 22 has a nut 28 secured thereon which holds all of the parts of the fish leader container in secure relationship.

The cutter blade 24 comprises a bar 27 of any suitable material having an aperture 29 therethrough through which the bolt 22 extends. The upper end of the bar 26 is bent to form an arcuate portion 30 having a knife-like edge 32 provided thereon.

On the other side of the fish leader container from the cutter blade 24, there is provided a disk-like washer 34. The guide means includes a rod 36 which is formed with an eye 38 through which the bolt 22 extends. The upper end of the rod 36 is formed in a loop 38, the overlying end portion 40 of the loop being so arranged as to be normally spaced from the other portion of the loop a distance somewhat less than that of the diameter of the fish leader 42.

The fish leader 42 can be moved with respect to the guide loop 38 while being restrained thereby by moving the fish leader 42 into the enlarged portion of the loop, as at 44. Means for rotating the guide means 26 is provided, and includes a handle 46 which can be pivoted from a position where it is folded against the plate 14 to a position normal thereto. The handle 46 includes a strip of metal or the like which is bent back upon itself and which receives both rotatably and slidably the rod 36, as at 48.

In use, the fish leader 42 is wound upon the drum 20. The guide means 26 serves to hold the fish leader and aids in its removal from the drum, and is necessitated by the arcuate flanges 16 and 18 which would otherwise cause the fish leader 42 to become entangled. The end of the fish leader may be maintained in a position where it may be easily grasped by engagement with the loop 38 and the handle 46 when turned into its position normal to the plate 14, can be utilized to rotate the guide means 26 relative to the plates 12 and 14 by merely holding the end of the leader 42 while rotating the guide means 26 relative to the plates 12 and 14. This will serve to lift the fish leader off the reel and supply the fish leader in the desired quantity. Then, the fish leader may be cut, using the blade 24. It is further noted that the guide means 26 and the fish leader 42 coact by engaging the fish leader with the guide means 26 before passing it under the arcuate portion 30 of the cutter blade 24 and utilizing the handle 46, the guide means 26 may be rotated to thus cause the fish leader to be cut by the blade 24.

From the foregoing, the construction and operation of the device will be readily understood and further explanation is believed to be unnecessary. However, since numerous modifications and changes will readily occur to those skilled in the art, it is not desired to limit the invention to the exact construction shown and described, and accordingly, all suitable modifications and equivalents may be resorted to, falling within the scope of the appended claims.

What is claimed as new is as follows:

1. A fish leader container comprising a pair of spaced opposed concave container plates, a spacer holding said plates in spaced relationship, shaft means extending through said plates and said spacer, guide means mounted on said shaft means on one side thereof, and a cutter blade rotatably mounted on said shaft on the opposite side thereof, said guide comprising a rod having an eye at one end thereof, said eye being rotatably received on said shaft, and a line engaging loop on the other end having portions thereof closely spaced for resiliently engaging and holding line therebetween and having other portions spread for guiding line, said loop overlying the peripheral edge of said plates and adapted to be rotated therearound, and a handle comprising a strip folded back upon itself and rotatably slidably receiving said rod for rotating the guide means.

2. A fish leader container comprising a pair of spaced opposed concave container plates, a spacer holding said plates in spaced relationship, shaft means extending through said plates and said spacer, guide means mounted on said shaft means, and a cutter blade mounted on said shaft, said guide comprising a rod having an eye at one end thereof, said eye being rotatably received on said shaft, and a line engaging loop on the other end having portions thereof closely spaced for resiliently engaging and holding line therebetween and having other portions spread for guiding line, said loop overlying the peripheral edge of said plates and adapted to be rotated therearound, a handle comprising a strip folded back upon itself and rotatably slidably receiving said rod for rotating said guide means, said cutter blade comprising a bar rotatably mounted on said shaft means, an arcuate portion at the end of said bar in alignment with the outer periphery of said plates, one edge of said arcuate portion having a sharpened surface, said shaft means including a headed bolt extending through said plates, said spacer, said guide means and said cutter blade.

References Cited in the file of this patent

UNITED STATES PATENTS

| | | |
|---|---|---|
| 451,771 | Quinn et al. | May 5, 1891 |
| 1,177,636 | Kuehn | Apr. 4, 1916 |
| 2,533,731 | Gomberg | Dec. 12, 1950 |